US012775856B2

(12) United States Patent
Ponthanplavil Razallian et al.

(10) Patent No.: US 12,775,856 B2
(45) Date of Patent: Oct. 27, 2026

(54) INFERRING USER ACTIONS

(71) Applicant: SAMSUNG ELECTRONICS CO., LTD., Suwon-si (KR)

(72) Inventors: Sojan Ponthanplavil Razallian, Sunnyvale, CA (US); Shankar Narayan Venkatesan, Dublin, CA (US); Akshat Sehgal, Fremont, CA (US); Artem Boykov, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1009 days.

(21) Appl. No.: 17/694,199

(22) Filed: Mar. 14, 2022

(65) Prior Publication Data

US 2023/0125008 A1 Apr. 20, 2023

Related U.S. Application Data

(60) Provisional application No. 63/257,939, filed on Oct. 20, 2021.

(51) Int. Cl.

| | |
|---|---|
| ***G06N 5/04*** | (2023.01) |
| ***G06F 11/34*** | (2006.01) |
| ***G06N 5/048*** | (2023.01) |
| ***G06N 7/00*** | (2023.01) |

(52) U.S. Cl.
CPC ......... *G06N 5/048* (2013.01); *G06F 11/3438* (2013.01); *G06N 7/00* (2013.01)

(58) Field of Classification Search
None
See application file for complete search history.

(56) References Cited

U.S. PATENT DOCUMENTS

| | | | | |
|---|---|---|---|---|
| 10,739,733 | B1 * | 8/2020 | Saxena | G05B 19/042 |
| 10,817,578 | B2 | 10/2020 | Mandal et al. | |
| 10,992,772 | B2 | 4/2021 | Lee et al. | |
| 2012/0303792 | A1 | 11/2012 | Sathish | |
| 2018/0288161 | A1 * | 10/2018 | Saxena | H04W 4/33 |
| 2020/0142956 | A1 | 5/2020 | Yu et al. | |
| 2021/0118442 | A1 * | 4/2021 | Poddar | G06F 16/9536 |

FOREIGN PATENT DOCUMENTS

| | | | |
|---|---|---|---|
| CN | 109063188 | A | 12/2018 |

* cited by examiner

*Primary Examiner* — Lut Wong
(74) *Attorney, Agent, or Firm* — Sughrue Mion, PLLC

(57) ABSTRACT

In a system which predicts useful actions for a user, a graph is used to permit better suggested actions. The graph includes base contexts which are related to time, place and occasion and augmented contexts which are related to device state and user actions. A base context together with one or more augmented contexts may provide a suggested action. Several alternative groupings of base contexts and augmented contexts is a scenario. A high-scoring suggested action from one of the scenarios is provided as the suggested action.

13 Claims, 14 Drawing Sheets

INFERRING USER ACTIONS

CROSS REFERENCE TO RELATED APPLICATION

This application claims benefit of priority of U.S. Provisional Application No. 63/257,939 filed on Oct. 20, 2021, the contents of which are hereby incorporated by reference.

FIELD

The present disclosure is related to inferring user activity based on signals from electronic devices.

BACKGROUND

A persona represents an archetypical user whose goals and characteristics represent the needs of a larger group of users.

An understanding of user's interaction with devices, contents or apps is a key to providing content intelligent services for the user. In this field, the accuracy of such understanding is always critical. Inaccurate understanding would result in an inappropriate or incorrect inferences of user activity, which may lead to actions based on inferences, such as incorrect service/content suggestion/recommendations, yielding inferior user experience.

Some systems are entirely dependent on usage history and content correlations for predicting content services for users. These predictions may not be accurate, and are incapable of handing the deviation of interest (DOI). Also, these recommendation are not situation driven, meaning the recommendation calculation does not account for the users' current or future situation parameters. This makes the system more vulnerable and error prone to handle user behavior not matching a historic pattern.

Many solutions based on learning user interaction patterns fail to provide intended results in an out of pattern case (OOP). In case of OOP, a problem is that a system may have no idea of users' current state and preferences.

SUMMARY

Provided herein is a method comprising: determining one or more current user-specific base contexts, each base context corresponding to a first node in a graph and having a predetermined connection to one or more user-behavior; determining for a user, based on information associated with a user device, one or more current user-specific and dynamically determined augmented contexts, each augmented context corresponding to a second node in the graph; for each base context node and each augmented context node, determining a user-specific value of a connection between that context node and each user-behavior node in the graph that the context node is connected to; comparing each user-specific value to a threshold value and, for each user-specific value above the threshold value, adding the context node corresponding to the connection to a scenario specific to the user-behavior node corresponding to the connection; scoring each scenario based on a group of user-specific values for a corresponding group of contexts in the each scenario; selecting the user-behavior node corresponding to a highest scoring scenario and identifying the selected user-behavior node as a current action of the user; and performing, by the user device, a user-device action based on the current action of the user.

In some embodiments, each user-specific value is based on a plurality of weighted indices.

In some embodiments, at least one index of the plurality of weighted indices comprises an average usage index defining an amount of a specific user-device interaction during a time window relative to a total amount of user-device interactions during the time window.

In some embodiments, at least one index of the plurality of weighted indices comprises a context affinity defining how close a specific user interaction occurrence is to a first boundary of a base context window or a second boundary of an augmented context window.

In some embodiments, at least one index of the plurality of weighted indices comprises a confidence index identifying a first nearness in time and a second nearness in frequency of occurrence of a vertical usage during a confidence interval.

In some embodiments, a vertical is a group of similar applications.

In some embodiments, the method further comprises storing the graph in a graph database.

In some embodiments, the method further comprises fetching the graph from a graph database.

Provided herein is an apparatus comprising: one or more memories storing instructions; and one or more processors configured to execute the instructions and cause the apparatus to: determine one or more current user-specific base contexts, each base context corresponding to a first node in a graph and having a predetermined connection to one or more user-behavior, determine for a user, based on information associated with a user device, one or more current user-specific and dynamically determined augmented contexts, each augmented context corresponding to a second node in the graph, for each base context node and each augmented context node, determine a user-specific value of a connection between that context node and each user-behavior node in the graph that the context node is connected to, compare each user-specific value to a threshold value and, for each user-specific value above the threshold value, adding the context node corresponding to the connection to a scenario specific to the user-behavior node corresponding to the connection, score each scenario based on a group of user-specific values for a corresponding group of contexts in the each scenario, select the user-behavior node corresponding to a highest scoring scenario and identifying the selected user-behavior node as a current action of the user, and perform a user-device action based on the current action of the user.

Also provided herein is a non-transitory computer readable medium storing instructions, the instructions configured to cause one or more processors of a computer to perform a method comprising: determining one or more current user-specific base contexts, each base context corresponding to a first node in a graph and having a predetermined connection to one or more user-behavior; determining for a user, based on information associated with a user device, one or more current user-specific and dynamically determined augmented contexts, each augmented context corresponding to a second node in the graph; for each base context node and each augmented context node, determining a user-specific value of a connection between that context node and each user-behavior node in the graph that the context node is connected to; comparing each user-specific value to a threshold value and, for each user-specific value above the threshold value, adding the context node corresponding to the connection to a scenario specific to the user-behavior node corresponding to the connection; scoring each scenario based on a group of user-specific values for a corresponding group of contexts in the each scenario; selecting the user-behavior node corresponding to a highest scoring scenario and identifying the selected user-behavior node as a current action of the user; and performing, by the user device, a user-device action based on the current action of the user.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

Figure 1A:
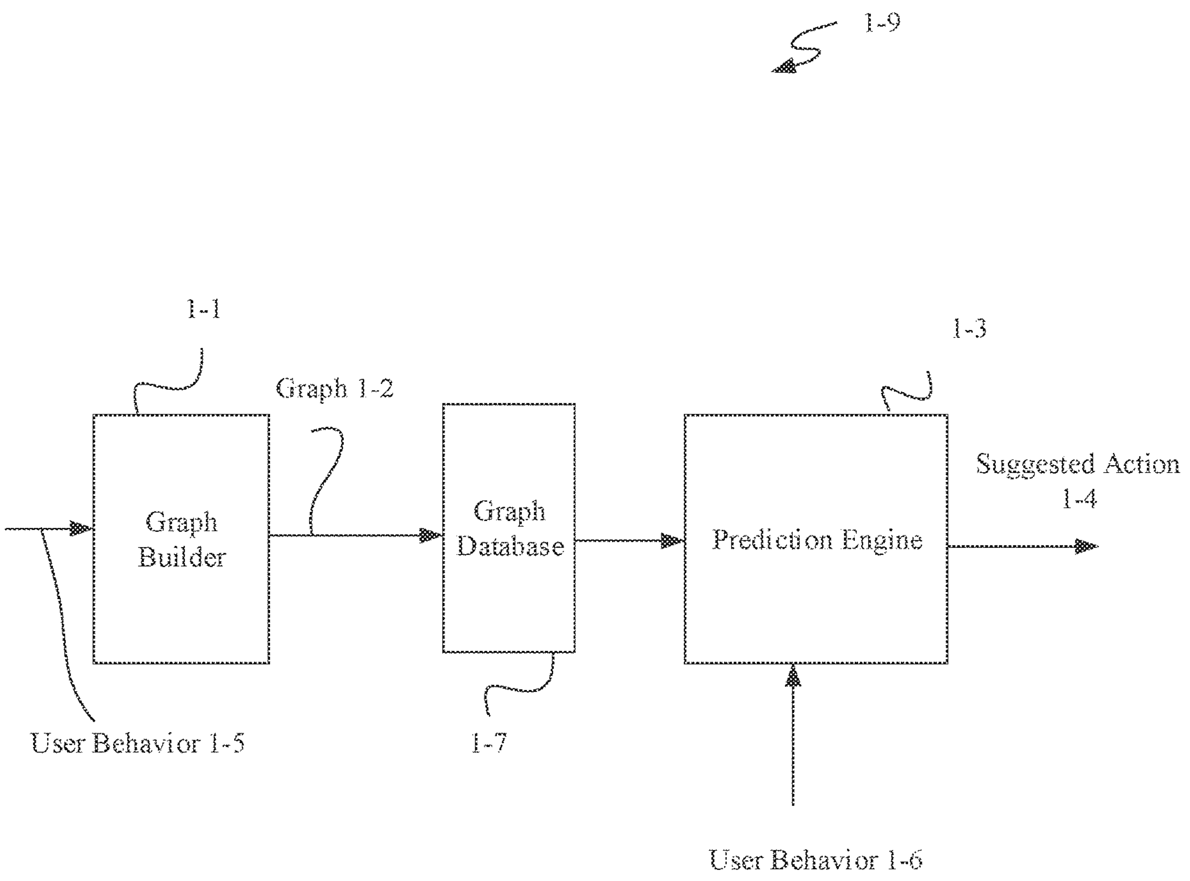
FIG. 1A illustrates a system including a graph builder and prediction engine for building a graph representing a persona and suggesting an action, according to some embodiments.

Disclosed herein is a system for deriving a model representing a specific individual. The model may be used to provide suggested actions for the specific individual, make predictions about the user's current or future behaviors, automatically trigger functionality, etc.

Context to Vertical (Action/Events) Mapping—(CVM) captures a user's pattern of interaction with application domains based on situations. Embodiments update user behavior dynamically and constantly so as to capture any user behavior or pattern changes in synchronization with given contexts. The solution additionally is capable of granularization of understanding the contextual situations more, in order to allow building a scenario with as many combinations of scenarios possible.

Embodiments scale and influence routines product scope as part of ambient intelligence across large numbers of data for future needs both from collaborative and federated learning approaches.

Embodiments derive user behavior patterns and suggest action flows.

Embodiments collect app signals per user and action and events along with relevant computations of the context to vertical mapping (CVM).

Embodiments provide an optimal structure for storing the information efficiently and understanding actions and associations to contexts.

Embodiments are efficiently scalable when new attributes for existing action sets or new action sets are added to address scalability. Some embodiments are incremental by nature.

Embodiments select an appropriate algorithm to perform predictions of action flow/automation sequences which are time efficient and accurate.

Context to Vertical (Action/Events) Mapping— (CVM) is a solution for following and capturing users' pattern of interaction with application domains based on asituations. A situation is defined as a collection of scenarios which occur or are present in a given timeline. The CVM updates user behavior dynamically and constantly so as to capture any user behavior or pattern changes. CVM is designed to suggest the users interest domains at any point of time based on the user scenario.

CVM is additionally capable of granularization of understanding the contextual situations more, in order to allow building a scenario with as many combinations of scenarios possible.

Embodiments, for example CVM, capture user's pattern of interaction with applications based on the situations/scenario. Embodiments are capable of granularization of the data collection in order to allow building sequence in conjunction with context and context augmentations.

Embodiments update user behavior dynamically and constantly to capture user behavior/pattern changes. Embodiments are designed to suggest users' contextual interest through continuous learning.

Context defines a current scenario of a user. Context is specified by a TPO value (Time/Place/Occasion). CVM uses 2 types of contexts.

A base context is the TPO values provided by any TPO provider such as Runestone (e.g. Work, Commute, Study, BedTime etc.). In some embodiments, an augmented context and a base context may be the same. In some embodiments, an augmented context and a base context are different.

Augmented context are the CVM inferred contexts that used to qualify a base context (e.g. Weekday, Weekend, WiFi-ON etc.). In some embodiments, an augmented context may be the same as a base context.

Verticals and actions are defined as a set of domains grouped together based on the content serviced. Verticals and actions preferences are captured from the snapshot of users application interaction during a given context. Context vertical and action mapping is part of CVM, in some embodiments. For example, user behavior of interaction with the domains has direct correlation with the given circumstances which is the vital aspect behind creating a context vertical & action mapping.

In addition, CVM also tracks the relative occurrence of contexts also. Since CVM is getting updated on the context changes, CVM marks the relational occurrence pattern with a "followed by" relation between the contexts. This mapping can be used for many use cases like proactive prediction of verticals before a context starts.

CVM uses boundaries. For example, each context has a boundary. A context boundary is defined as time or space co-ordinates that covers the existence of a context. Some contexts are specific to the time whereas others may be more relevant to the space co-ordinates. So context boundaries can be a time bound, location bound etc.

A CVM engine uses the Application Usage Tracker to find the pattern of an app usage for a given context. Apps usage are being captured for the given time boundary of a context. When a context finishes the verticals are mapped against the context.

The CVM structure uses a graph database (DB). Since the magnitude of the context—vertical & actions and context-context mappings will be high as CVM engages capturing on user action constantly, a Graph DB is employed to store the relations. This allows saving of the user patterns and updating it continuously.

CVM handles contextual selection of verticals & actions. CVM is dealing with two kinds of contexts based on their generation methods. The context given by Runes Stone and any other application capturing scene snapshots are considered as a Base Context. The Base contexts are highly the optimized and learned contexts from users' routine, device connections and even user inputs. CVM primarily depends on collecting the Base contexts. (e.g. WakeUp, Commute, Driving, Parking etc.)

In order to handle the breakup routine or outlier context, CVM needs to bind the context and vertical around any other additional signal available. These may not be directly related to the user intentions, but they can qualify the selection of a vertical based on a given set of Base contexts. These are called the augmented contexts.

CVM defines a multitude of augmented contexts that can be derived from device state or user state or from other third-party service. Augmentation of context is again dependent on the verticals. Each vertical has affinity to specific augmented contexts. As CVM receives any base context change, the verticals for the base context are being queried. Based on the affinity of the vertical the augmentation of context is applied.

The CVM architecture includes a relation structure between context and verticals & actions. CVM receives context updates and vertical usage preference as the input and creates a graph structure to hold the associations effectively.

CVM includes dynamic learning of context (vertical and action event) patterns.

CVM updates the mapping each time the user has context change. So any changes to the pattern of usage under a situation is updated to the CVM graph structure. Graph structure facilitates a variety of indices to various parameters associated with context vertical mapping. These parameters can be used for defining the ranking and preference model at any given context.

Usage Index is a measure of relative user session for any application in a given context.

The context window is different for different contexts. Even the same context may show different context window sizes over multiple occurrences. So usage index is calculated with the aggregate usage of vertical against the context window length. The value is normalized to a scale of 0 to 1.

Context Window Delta—is a tuning param used to control the context window size if aggregate usage is spanned outside the context boundary. This case mainly occurs when the vertical is more preferred or acted when at the edge of the context window. Especially immediately before the beginning or after the end of a context.

Context Affinity is the measure of nearness of app interaction to the time boundaries of a context (start and end times). A context generally can span from a few minutes to a day. In case of wide context windows, the vertical used in the middle of the context window is mostly irrelevant compared to the vertical usage at context horizons. Context affinity denotes how close the vertical interaction is with the start or end of the context window.

Context affinity plays a major role in eliminating irrelevant suggestions of vertical. As Context affinity is diverging from 0 the vertical & actions becomes more relevant to the context.

Confidence Index tracks the recency and repeatedness of a vertical usage compared to a context. The Confidence Index is stored as an 8-bit integer value (only for evaluations as proof of concept). The most significant bit is set for if vertical is used in the context window. Any absence of usage in context will reset the most significant bit. The integer is right shifted each time before recording a new data.

As described more fully herein, a user "scenario" can be fragmented into many contexts. Provided herein is a model for representing the scenario as a function of contexts and their impact on user behavior. Embodiments combine the contexts to get a collaborated context leading to a scenario creation. In particular embodiments, contexts are captured from multiple sources which are independent and discrete in their source level. In particular embodiments, contexts are augmented with other known situational or system given contextual signals.

User behaviors and/or reactions are observed and learned with the user's device and app interactions. Behavior can include a connected set of reactions, where the reactions are connected through a function of user imprints. Embodiments make use of the fact that the usage pattern carries a correlation with context laying on different sources.

Embodiments build a collection of context-behavior sets; each set is connected with context-context or entity-entity model. In particular embodiments, the system uses multiple indices defined for the reaction elements connection: confidence index (CI), context affinity (CA), and average usage index (AUW). Embodiments recreate a scenario by compiling contexts and predicting the behavioral next steps. The steps are predicted with the learned patterns on context to entity and deviation of user behavior. A damping factor on capture allows immediate fluctuations but may provide better results for long term behavioral changes.

Other recommendation systems are persona-based, where a persona is created for a user, based on the interaction pattern of similar users. The persona solution targets or is meant for an average user type in each persona, and there is no high degree of personalization for a specific user. The collaborative approach also leads to differential privacy (time boundaries of what user is doing being combined with other information and the user identity will be masked) concerns because federated learning may leak personal information of an individual.

With high mobility and communication connectivity in the world of today, there is a huge demand for a content or action recommendation technology with a high degree of prediction accuracy, personalization results and without creating privacy concerns. The solution provided herein is able to accurately infer user actions, even when the user is engaging in DOI behavior and/or OOP behavior.

Further to the problem addressed by this application, many recommendation systems lack scenario intelligence.

Recommendations only use historically learned patterns, and decisions are made, only using pattern matching. Users' current situation parameters play little or no role in the recommendation decision. A pre-determined recommendation set is used, rather than determining a recommendation dynamically when demanded. Often a system includes a rule-based system, where a set of pre-determined suggestions matching a pre-defined rules are served as suggestions. This is suited only for consistent and static user behaviors. For a dynamic user, such recommendation systems provide results which are inaccurate or inadequate.

Each user is different in his/her content interaction behaviors.

A collaborative approach to learn and predict user actions will lose a lot of user-specific information since there is a large degree of deviation from user to user in case of behavior patterns (e.g., in an individual user's action). Generalizing this to a group will lead to a huge gap in personalization. For example, users' tendency can vary from situation to situation, and time to time. But a recommendation system based only on historical user information, and/or a recommendation system that uses aggregated user information, will not dynamically correctly predict variations in user behavior, as explained more fully herein.

As explained more fully herein, a solution to the problems described above inferring user actions or environment based on a dynamic creation of patterns rather than based on collections of historical patterns derived from previously occurring user information. For example, embodiments of the systems described herein can make accurate predication even when encountering unusual or previously unrecognized user behaviors (e.g., unusual or unrecognized collections of environmental information determined based on signals from the user's electronic devices, as described more fully herein).

FIG. 1A illustrates a system 1-9 including a graph builder 1-1 and a prediction engine 1-3. Each of the graph builder 1-1, the prediction engine 1-3 and the graph database 1-7 may be implemented using one or more processors and one or more memories storing instructions to be executed by the one or more processors.

In some embodiments, the graph 1-2 is stored in a graph database 1-7. The graph 1-2 may be later used to infer user actions and/or environments, and these inferences may be used to, e.g., provide content or action recommendations for a user 1-16. The resulting content or action recommendations have a high degree of prediction accuracy, in that such recommendations are based on accurate inferences about the user's circumstances or what the user is currently doing. The system of FIG. 1A also does not create privacy concerns because personal parameters of the user 1-16 are not retained in the graph database 1-7.

Graph builder 1-1 uses user behavior 1-5 to produce graph 1-2. Prediction engine 1-3 uses the graph 1-2 and user behavior 1-6 to produce a suggested action 1-4. A suggested action can be a recommendation/suggestion, an automatic functionality (e.g., opening an app) that gets triggered, etc., and may be based on a predicted future action or sequence of actions where the prediction is based on the identified current action.

As an alternative to prediction engine 1-3 or in addition to prediction engine 1-3, system 1-9 may include a neural network in the form of a long short-term memory (LSTM), and/or a learning model. The prediction engine 1-3, LSTM and/or learning model may also be uploaded to be used as a component in federated learning (a machine learning technique that trains an algorithm across multiple decentralized edge devices or servers).

Figure 1B:
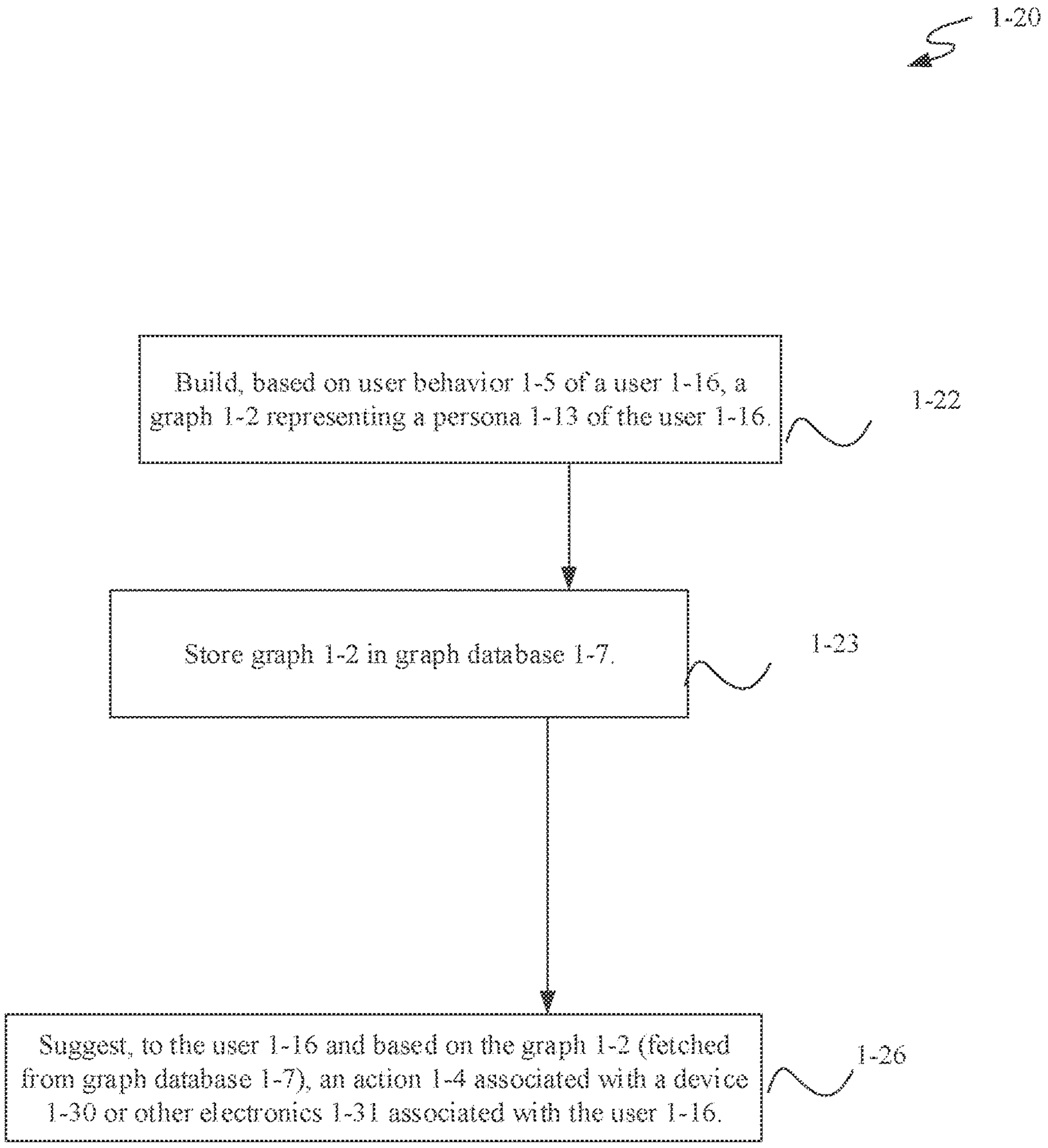
FIG. 1B illustrates logic for building the graph representing the persona and suggesting the action, according to some embodiments.

FIG. 1B illustrates logic 1-20 for providing a suggested action to the user 1-16. At operation 1-22, logic 1-20 builds, based on user behavior 1-5, the graph 1-2 containing information about the user 1-16. At operation 1-23, the graph 1-2 is stored in the graph database 1-7. At operation 1-26, the graph 1-2 is fetched from the graph database 1-7 and logic 1-20 suggests to the user 1-16 a suggested action 1-4. The suggested action 1-4 is obtained using the graph 1-2 and the second behavior 1-6. The suggested action 1-4 may be associated with a device 1-30 of the user 1-16 or other electronics 1-31 associated with the user 1-16. In some embodiments, logic 1-20 observes a second behavior 1-6 of the user 1-16 or receives information about a second behavior 1-6 of the user 1-16 before proceeding from 1-23 to 1-26.

Figure 2:
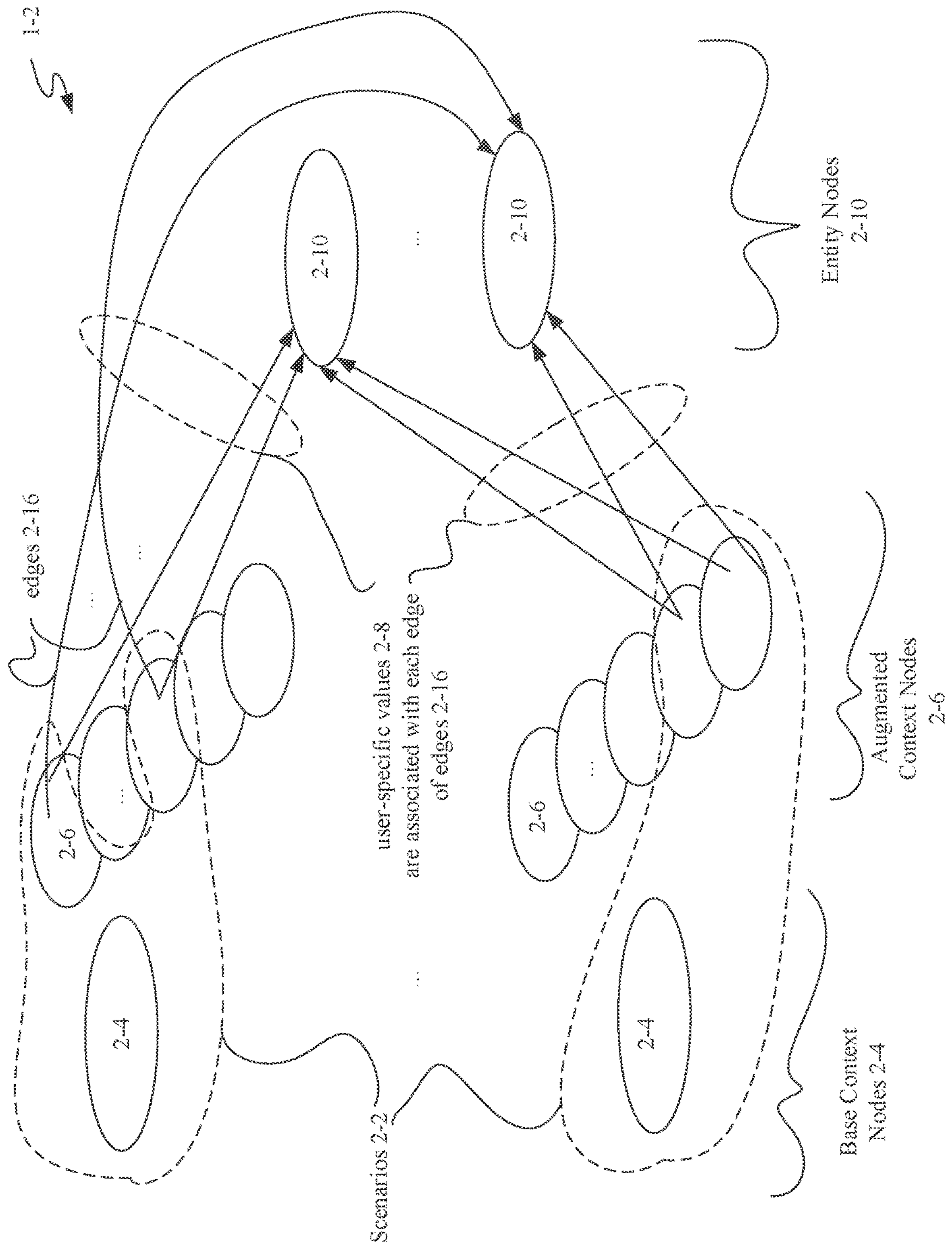
FIG. 2 illustrates an example of the graph representing the persona, according to some embodiments.

FIG. 2 is a schematic representation of the graph 1-2. The graph 1-2 includes nodes, edges, scenarios, user-specific values and suggested actions. Examples of nodes are base context nodes 2-4, augmented context nodes 2-6 and entity nodes 2-10. An entity node may also be referred to as a behavior node. An example of an edge is edge 2-16 connecting an augmented context node 2-6 with an entity node 2-10. Each edge is associated with a user-specific value 2-8. Examples of user actions or behaviors are the entity nodes 2-10. A scenario 2-2 is a combination of a base context node 2-4 and zero or more augmented context nodes 2-6. In FIG. 2, two different scenarios 2-2 are illustrated using dashed lines. One user-specific value 2-8 is associated with each edge 2-16.

Further description of details of the graph 1-2 is given below with respect to FIGS. 3A and 3B.

Figure 3A:
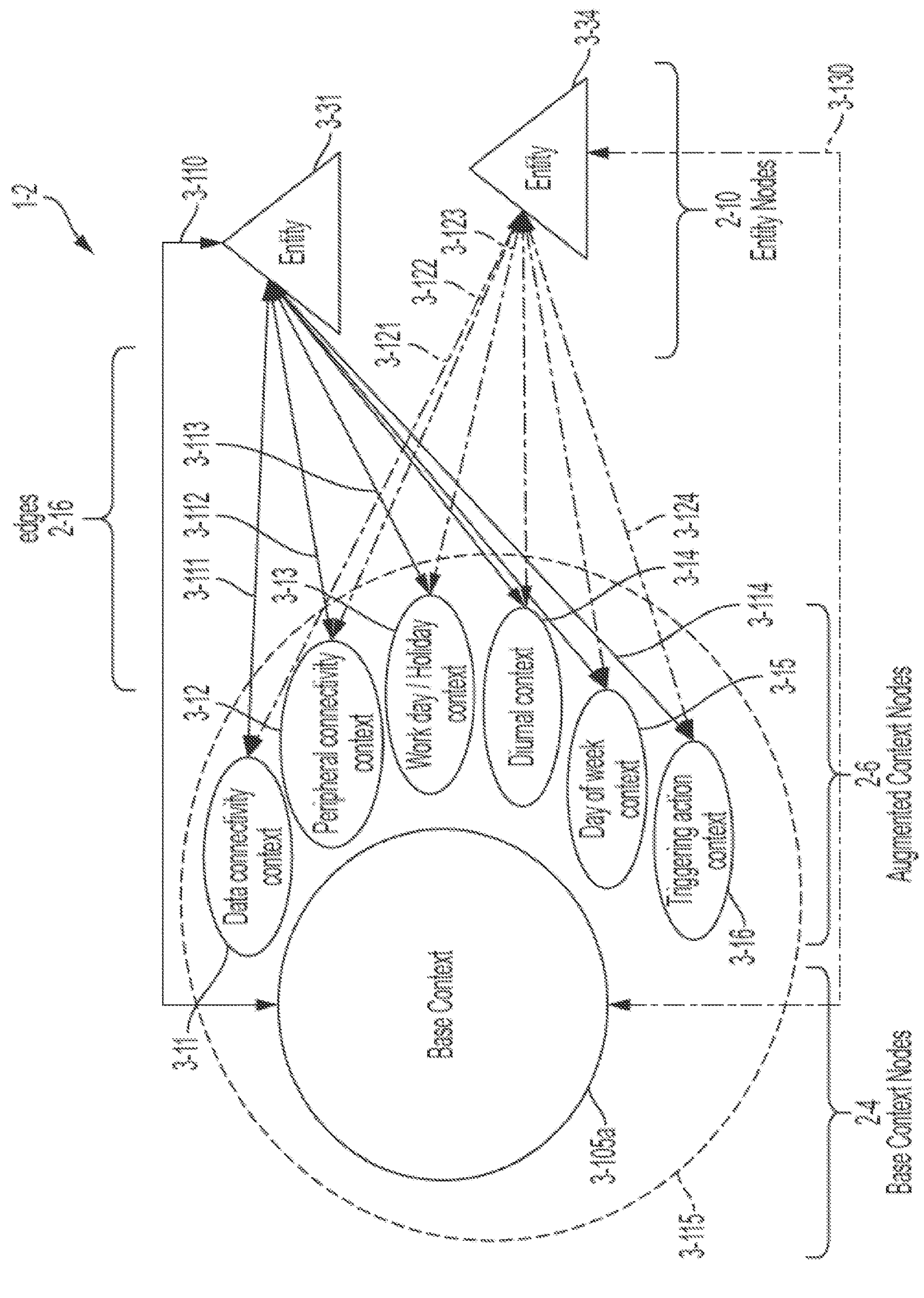
FIG. 3A illustrates another example of the graph representing the persona, according to some embodiments.

FIG. 3A illustrates an example of the graph 1-2 with further description of augmented context nodes 2-6 and edges 2-16.

In FIG. 3A, examples of edges 2-16 include edges 3-110, 3-111, 3-112, 3-113 and 3-114 connecting respective context nodes to entity node 3-31 and edges 3-121, 3-122, 3-123, 3-124 and 3-130 connecting respective context nodes to entity node 3-34.

The graph 1-2 of FIG. 3A includes a single scenario 3-115 including base context 3-105A and augmented context nodes 3-11 to 3-16.

FIG. 3A illustrates examples of augmented context nodes 2-16 as items 3-11 (data connectivity context), 3-12 (peripheral connectivity context), 3-13 (work day/holiday context), 3-14 (diurnal context), 3-15 (day of week context) and 3-16 (triggering action context).

An entity, for example 3-31 or 3-34, is a specific user action or interaction with a user device. In one example, 3-31 corresponds to the user 1-16 opening a specific social media application. Another entity, for example 3-34, is commuting (in an example). Entity nodes do not need to be pre-labeled as corresponding to any particular user activity. Graph builder 1-1 does not need to infer or understand what an entity semantically represents (e.g., by providing the entity node with a human-readable label). Graph builder 1-1 can create contextual relationships and prediction engine 1-3 can provide suggestive actions/predictions, etc. This can include graph builder 1-1 updating the graph, without having to understand what the nodes in the graph actually semantically correspond to and without having to create rules around the semantic meanings of entities and contexts.

FIG. 3A illustrates a single base context node 3-105A. Graph 1-2 can include many base context nodes corresponding to many different base contexts (see FIG. 2). A base context is a set of information having particular importance or usefulness for a given type of activity. The exact information making up a particular base context is, in particular embodiments, specified by the software application or third-party using the system 1-9. For example, a maps application may specify time-of-day and place information as being base contexts, while a video application may specific time-of-day and Wi-Fi network connection as base contexts. As illustrated in FIG. 3A, an augmented context 3-12 for one particular application (e.g., "peripheral connectivity context") may be a base context for another application. As explained more fully herein, in particular embodiments base context may have more weight than augmented contexts when determining a scenario for a user.

FIG. 3A illustrates several augmented context nodes 3-11, 3-12, 3-13, 3-14, 3-15 and 3-16. Augmented contexts represent types of information (e.g., as determined from device signals) occurring at a particular time. While base context nodes 2-4 are applicable to all users, augmented contexts 2-6 and their relationships with other nodes in the graph are user-specific and time-specific. For example, a specific user may have an augmented context representing "peripheral connectivity context" connected by an edge 2-16 to an entity representing "commuting" because that user connects their mobile device to their car via Bluetooth while commuting (see for example, FIG. 3B items 3-12 and 3-34). Due to personalization another user might make no such connection (no edge 2-16 is present for those specific nodes), and therefore the graph for that user has no connection between "peripheral connectivity context" (item 3-12) and the "commuting" entity (item 3-34).

Connections 3-110, 3-111, 3-112, 3-113, 3-121, 3-122, 3-123, 3-114, 3-124 and 3-130 describe the relationships between base context nodes 2-4 (e.g., 3-105A of FIG. 3A), augmented context nodes 2-6 (e.g., 3-11, 3-12, 3-13, 3-14, 3-15 and 3-16 of FIG. 3A) and entity nodes 2-10 (e.g., 3-31 and 3-34 of FIG. 3A). As mentioned above, connections between augmented context nodes 2-6 and entity nodes 2-10 are dynamically determined and are user-specific. In some embodiments, the connections between base contexts nodes 2-4 and entity nodes 2-10 (e.g., 3-110 and 3-130 of FIG. 3A) are predetermined (although a user-specific value 2-8 of an edge 2-16 may change). A connection between a particular augmented context node and an entity node is dynamically made and updated when the context corresponding to that context node is occurring at the same time as the user actions or environment corresponding to that entity node (or near in time to each other), as explained more fully herein.

At any given time, a variable N number of augmented context nodes 2-6 are occurring for any particular user, for example, user 1-16. The graph builder 1-1 determines which combinations or subsets of those N contexts should be grouped together to predict a user action. Selected groupings of contexts are called scenarios 2-2 (FIG. 2), as illustrated by dotted circles (not the dashed lines of user-specific values 2-8). To determine whether and how to group particular base context nodes 2-4 and augmented context nodes 2-6 into a scenario 2-2 at a given time for the user 1-16, the graph builder 1-1 evaluates a function f(ur) to obtain a user-specific value 2-8. That is, the graph builder 1-1 evaluates the function f(ur) for each connection (edge) between each of the N presently occurring base context nodes 2-4 and augmented context nodes 2-6 for the user 1-16 and the entity nodes 2-10 that each base context node or augmented context node is connected to. The function f(ur) is user-specific. In some embodiments, the function f(ur) for each edge is determined at runtime based on a weighted sum of indices.

For example, f(ur) may be determined as a weighted average of average usage index (AUI), context affinity (CA) and confidence index (CI).

$$f(ur)=k1^*\mathrm{AUI}+k2^*\mathrm{CA}+k3^*\mathrm{CI} \qquad \text{Equation (1)}$$

where k1, k2 and k3 are weights, and

A1 is an average usage index, A2 is a context affinity and A3 is a confidence index.

Verticals and actions include a set of domains grouped together based on the content serviced. Verticals and action preferences provide a direct snapshot of reactions of user 1-16 for a set of contexts.

A user pattern of interaction with the domains (augmented context nodes 2-6) has a direct correlation with the given circumstances. This correlation permits a context to vertical and action mapping.

Contexts are mapped to verticals and actions to build a user interaction function for each context. The system 1-9 also tracks the relative occurrence of contexts.

Relational occurrence patterns with a "followed by" relation are captured between the contexts as they occur.

Every context has a boundary. See FIG. 7. A context boundary is defined as time or space coordinates that covers the existence of a context. Some contexts are specific to the time whereas others may be more relevant to the space coordinates. So context boundaries can be a time bound or location bound, or both. For example, a context representing a user's voice call may include time boundaries, while a context representing a user's connection to their home wifi network may include space boundaries representing the range of their wifi signal. However, both examples may also use space or time boundaries, respectively. Graph builder 1-1 uses the context session tracker 4-103 to find the pattern of an app usage for a given context. Apps usage is captured for the given time boundary of a context.

The system 1-9 updates context-entity node mapping each time the users context changes. Any changes to the pattern of usage under a situation is updated and relations are updated. For example, regarding connections between context nodes and entities nodes corresponding to contexts and entities that shared spatial or temporal boundaries, those connections may be updated. In particular embodiments, the graph 1-2 maintains a variety of indices associated with context—entity mapping. These indices are calculated and stored. The indices are used in ranking and preference modelling, as described more fully herein.

The following discussion pertains to usage index, which is one of the indices that may be used to determine the correct scenario for a user.

Average usage index is a measure of relative user session for any entity in a given context. The context window (e.g., the boundaries in time or space) may be different for different contexts. Moreover, the same context may have different context window sizes (again, in time or space) over multiple occurrences. Average usage index is calculated with the aggregate usage against the context window length. The value is normalized to a scale of 0 to 1.

Fine tuning of average usage index can be done (Context Window Delta ΔCW). ΔCW is a tuning parameter used to control the context window size if aggregate usage is spanned outside the context boundary. The fine tuning handles user reactions at the edge of the context window. This may be especially useful for handling user reactions (UR) immediately before the beginning or after the end of a context. In particular embodiments, the average usage index may calculated as:

UI=AVU/(CW+CWD) Equation (2)

where AVU is an aggregate vertical (e.g, application or class of application) usage in context window, CW is a context window, CWD is a context window Delta.

A1=ave(UI)=((SS−1)*Current Average Usage Index+New Usage Index)/SS Equation (3)

where SS is an averaging sample size.

The usage index range is from 0.0 to 1.0.

A usage index value of 0.0 indicates that a vertical is never used in this window. For example, a video-playing application vertical may never occurring during a context associated with the user driving a car, and thus the usage index value would be 0. A vertical can include the use of the same application on a different device.

A usage index of 1.0 indicates that a vertical is used throughout the context window.

The following discussion pertains to context affinity, which is one of the indices that may be used to determine the correct scenario for a user.

Context affinity is the measure of nearness of app interaction to the time or space boundaries of a context.

A context's usage in time generally can span from, for example, a few minutes to a day. In case of wide context windows, the user reactions in the middle of the context window is mostly irrelevant compared to the user reactions usage at context horizons e.g., at the edges of the context boundaries, which are associated with the beginning and ending of the context.

Context affinity denotes how close the vertical interaction is with the start or end of the context window. An example context affinity (CA) may be calculated as:

|CA|=CBU*2/CW Equation (4)

where CW (context window)=CE−CS, and

CE is the context start time, CS is the context end time.

CBU(closer to boundary usage)=min(FVU−CS,CE−LVLT) Equation (5)

where LVU is the last vertical usage in the context window,

FVU is the first vertical usage in the context window, and

SS is the sample size.

CA=|CA|*(CBU−(CW/2)/|CBU−CW/2| Equation (6)

Average context affinity=((SS−1)*Current CA+New CA)/SS Equation (7)

The context affinity ranges from −1.0 to +1.0.

Context affinity is used in contextual preference calculations. That is, context affinity may play a major role in eliminating irrelevant suggestions to user based on context, Since context affinity is diverging from 0 the vertical becomes more relevant to the context.

Context affinity is applied as follows:

if the value is near−1.0, the vertical is used immediately as the context start, if the value is near+1.0, the vertical is used immediately before context end, if the value is near 0, the vertical does not coincide with the beginning or the ending of the context, which in many cases means that the vertical is not meaningfully associated with the context. Thus, in particular embodiments, context affinity is one useful metric for determining which contexts are meaningfully correlated with vertical usage (which may be an entity).

Figure 6:
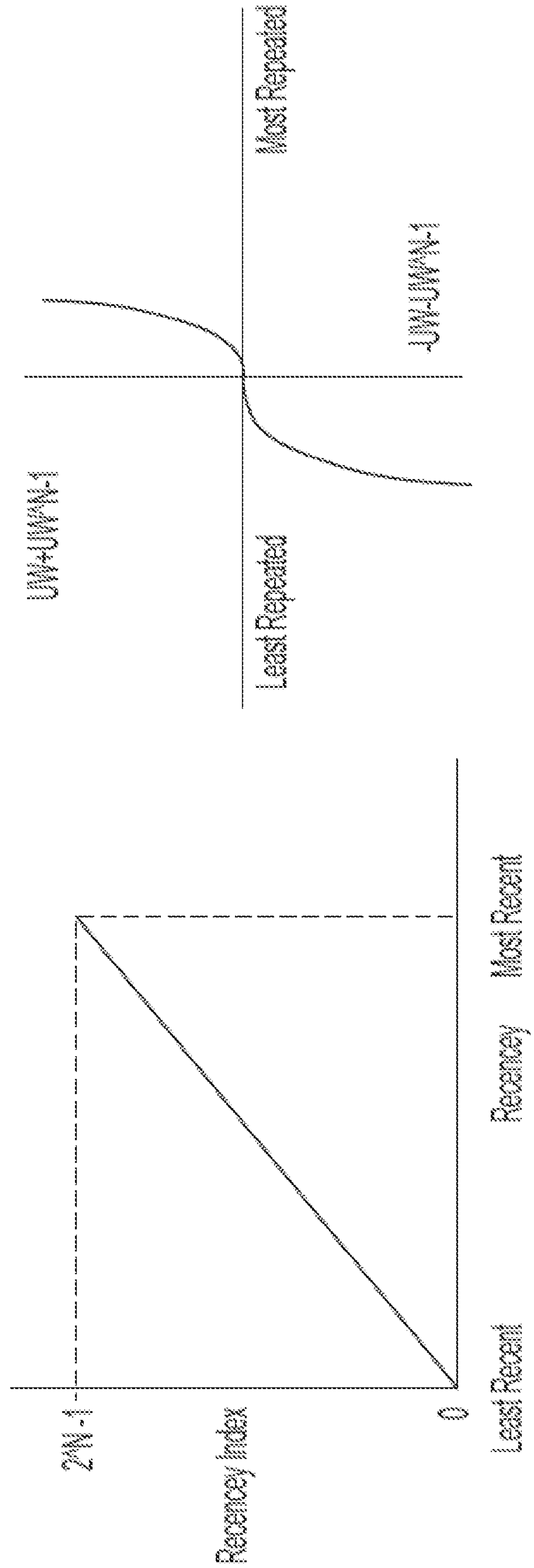
FIG. 6 illustrates confidence index parameters, according to some embodiments.

The following discussion is directed to confidence index, which is one of the indices that may be used to determine the correct scenario for a user. Please also refer to FIG. 6. In the plot on the left of FIG. 6, a value of a recency index is shown on the y-axis and a qualitative meaning ranging from "least recent" to "most recent" is shown on the x-axis. In the plot on the right of FIG. 6, a value of a repeatedness index is shown on the y-axis and a qualitative meaning ranging from "least repeated" to "most repeated" is shown on the x-axis.

Generally, confidence index tracks the recency and repeatedness of a vertical usage compared to a context.

In particular embodiments, the confidence index may be stored as an 8 bit integer value keeping track of recency and repeatedness.

The most significant bit is set for if vertical is used in the context window.

Any absence of usage in context will reset the most significant bit.

The integer is right shifted each time before recording a new data.

Generally, confidence index (CI) is an N bit number.

CI=(CI>>1)|(UM or NUM) Equation (8)

where UM is a usage mask such as the 8 bit value 0B10000000, NUM is a non usage mask such as 0B00000000.

The recency index ranges from 0 to 2^N−1.

The recency index is applied as follows. A recency index of 0 indicates that a vertical is not used in last N occurrences of the context. A recency index of 2^N−1 indicates that a vertical is always used in last N occurrences of the context. A recency index of more than 0 and less than2^N−1 indicates that a vertical has been recently used.

A repeatedness index is calculated as a function of repeated usage scores in the bit pattern as follows.

```
F(0->N) {
BitwiseUsage = (CI>>|SEM)==1
BitwiseUsage == 1?1:-1
RCF = RCF+BitwiseUsage
Repeatedness Index = Repeatedness Index + (RCF*UW)
}
Repeatedness Index min = - UW - UW^(N-1) (assuming starting RCF 0)
Equation (9)
```

Repeatedness Index max=UW−UW^(N−1)(assuming starting RCF0) Equation (10)

where SEM is a score extraction mask, 0B00000001, RCF is a repeat counter, UW is a usage weight or tuning factor for usage weight and N is a number of bits in the repeatedness index.

Equation (1) illustrates f(ur) as determined based on the indices described above, but other combinations to determine f(ur) are possible.

In some embodiments, the weight given to a particular base context-entity connection is higher than the weight given to each augmented context-entity connection.

The weights used for each index to determine f(ur) for a particular connection can be based on both the particular entity node and the particular context node corresponding to the connection. For example, an entity corresponding to the user waking up in the morning may weight the "context affinity" index relatively highly, as that entity occurs during relatively short time frame and the "context affinity" measures temporal nearness.

To create scenarios at a given time for a given user, for each of the N presently occurring contexts for a user, f(ur) is computed for each context-entity connection and compared to a threshold value. If the f(ur) is below the threshold, then the context-entity connection is not considered during the current scenario creation. If the f(ur) function is above the threshold, then that context-entity connection is considered. The resulting context-entity connections are grouped into scenarios 2-2. Each scenario is a collection of the contexts with a connection to a specific entity, with the connections each having an f(ur) above the threshold. An overall f(ur) is determined for each scenario-entity pairing, and the highest f(ur) for a given scenario is selected. The entity (e.g., entity node 2-10) corresponding to the selected scenario 2-2 is predicted as the user's current action or activity (suggested action 1-4 of FIG. 1A).

Thus, out-of-ordinary user behaviors can be determined because the overall scenario score is used, which may be high even when certain usually occurring contexts are missing in an given instance. For example, suppose a morning "wake-up" entity usually includes several contexts, including day of the week and time. On a weekday, the user usually wakes up at 7 am. But on a weekday holiday, a user's wakeup may not include the usual 7 am time context. However, the presence of other contexts associated with wakeup, such as the user checking messages, news, and social media apps, may still score highly, resulting in the invention determining the that user's contexts (which deviate from normal with respect to time) still indicate that the user is waking up.

While the description above relates to determining user events that are currently occurring, embodiments can also be used to predict future user actions or sequences of actions, and provide recommendations accordingly.

An example will now be discussed.

Figure 3B:
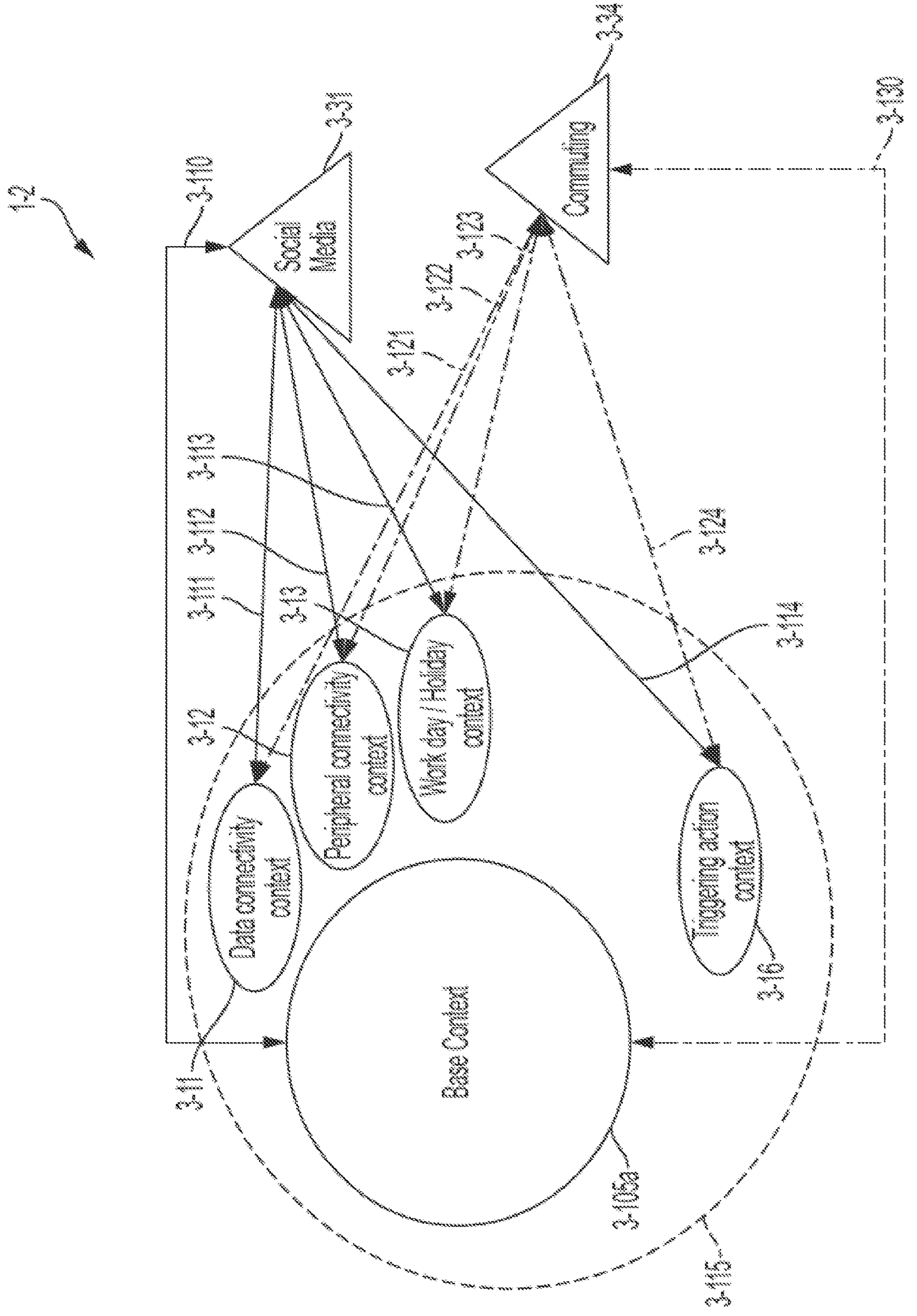
FIG. 3B illustrates yet another example of the graph representing the persona, according to some embodiments.

FIG. 3B illustrates an example of graph 1-2 in which entity node 3-31 is an action of opening a particular social media application and entity node 3-34 is an action of commuting from home to work.

The prediction engine 1-3 uses the graph 1-2 to compute scores to determine a suggested action. The suggested action depends on the user-specific values 2-8 as explained for FIG. 3A. An example of user-specific values for FIG. 3B and the social media entity 3-31 is given in the table below. The activated value is the user-specific value after comparison with a threshold.

specific social media entity node

| Augmented Context | user-specific value | activated value after threshold |
|---|---|---|
| Data connectivity | 1 | 1 |
| Peripheral connectivity | 0 | 0 |
| Workday/holiday | Work day | 1 |
| Diurnal | Day | 1 |
| Day of week | Monday | 0 |
| Triggering action | None | 0 |
| Total Score for specific social media entity | n/a | 3 |

Before determining the suggested action, a score is determined for commuting as shown in the table below.

commuting entity node

| Augmented Context | user-specific value | activated value after threshold |
|---|---|---|
| Data connectivity | 0 | 0 |
| Peripheral connectivity | 1 | 1 |
| Workday/holiday | Work day | 1 |
| Diurnal | Day | 1 |
| Day of week | Monday | 0 |
| Triggering action | None | 1 (Driving Car) |
| Total Score for commuting | n/a | 4 |

The total score for the specific social media entity is 3 and the total score for commuting is 4. The prediction engine 1-3 identifies the commuting entity 3-34 as a proper basis for a suggested action 1-4; i.e., prediction engine 1-3 infers the entity node 3-34 as the user's current action. As an example of a recommendation or suggested action, the prediction engine 1-3 may ask if the user 1-16 would like a sound system of the automobile (car) of user 1-16 should begin operating to produce music from a play list of the user 1-16 through speakers of the automobile. A play list is a list of specific songs. The songs may be stored on memory of a user device 1-16, such as a cell phone, able to communicate with the sound system of the automobile. The sound system is an example of other electronics 1-31.

In another example, if the total score for the specific social media entity is higher than the score for commuting, the prediction engine identifies the specific social media entity 3-31 as a proper based for the suggested action 1-4. In that case, the prediction engine 1-3 may ask if the user 1-16 would like to launch the specific social media application and request, for example, a specific video feed such as news, weather, sports or business stock price quotes to be produced through the user interface (display screen and speakers) of a device 1-30 of the user 1-16 or a TV. The TV is an example of other electronics 1-31.

Figure 4A:
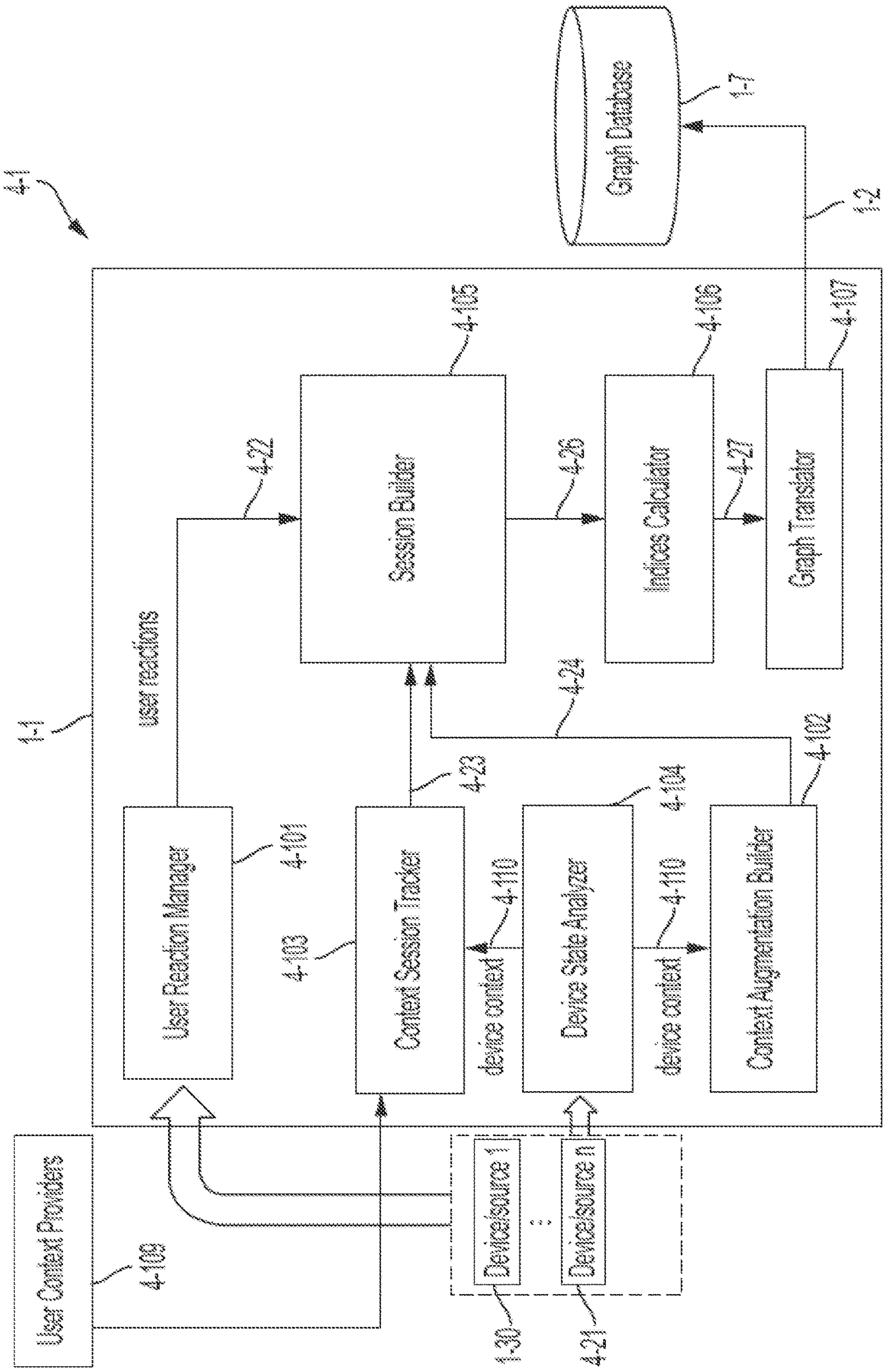
FIG. 4A illustrates an example block diagram of the graph builder, according to some embodiments.

FIG. 4A illustrates an example block diagram of the graph builder 1-1 in a system 4-1.

The graph builder 1-1 receives inputs from device 1-30 and possibly other devices 4-21. The graph builder 1-1 may also receive an input from user context providers 4-109.

The graph builder 1-1 includes a user reaction manager 4-101 which produces user reactions 4-22 based on the input from device 1-30 and also, in particular embodiments, based on input from other devices 4-21. The user reactions 4-22 are provided as an input to a session builder 4-105.

The graph builder 1-1 includes a context session tracker 4-103 which receives an input from user context providers 4-109.

The graph builder 1-1 also includes a device state analyzer 4-104 which receives an input from the device 1-30 and possibly also from other devices 4-21. The device state analyzer provides device context 1-110 to the context session tracker 4-103.

Based on the information from the user context providers 4-109 and/or the device context 4-110, the context session tracker 4-103 determines a probability of each possible context for the user 1-16 and feeds this vector of probabilities as information 4-23 to the session builder 4-105.

The graph builder 1-1 also includes a context augmentation builder 4-102 that receives the device context 1-110 and determines a probability of each possible augmented context and feeds this vector of probabilities as information 4-24 to the session builder 4-105.

The session builder 4-105 operates on the user reactions 4-22, information 4-23 and information 4-24 to an indices calculator 4-106 as information 4-26. The indices calculator produces information 4-27 and provides this to a graph translator 4-107. The output of the graph translator 4-107 is the base context nodes 2-4, augmented context nodes 2-6, user-specific values 2-8 and entity nodes 2-10. The user-specific values may be updated based on user behavior 1-6 before determination of a suggested action 1-4 by the prediction engine 1-4.

FIG. 4A outlines an implementation flow based on multiple context signals/providers (apps, features, actions etc.) to derive a context session and tracking the same until the close of the session. The tracker may be updated to enumerate the associated contexts. FIG. 4A illustrates how the sessions are managed on each context, respective indices are calculated and stored in the graph DB thus capturing the user reaction and also capturing respective associations to contexts.

Figure 4B:
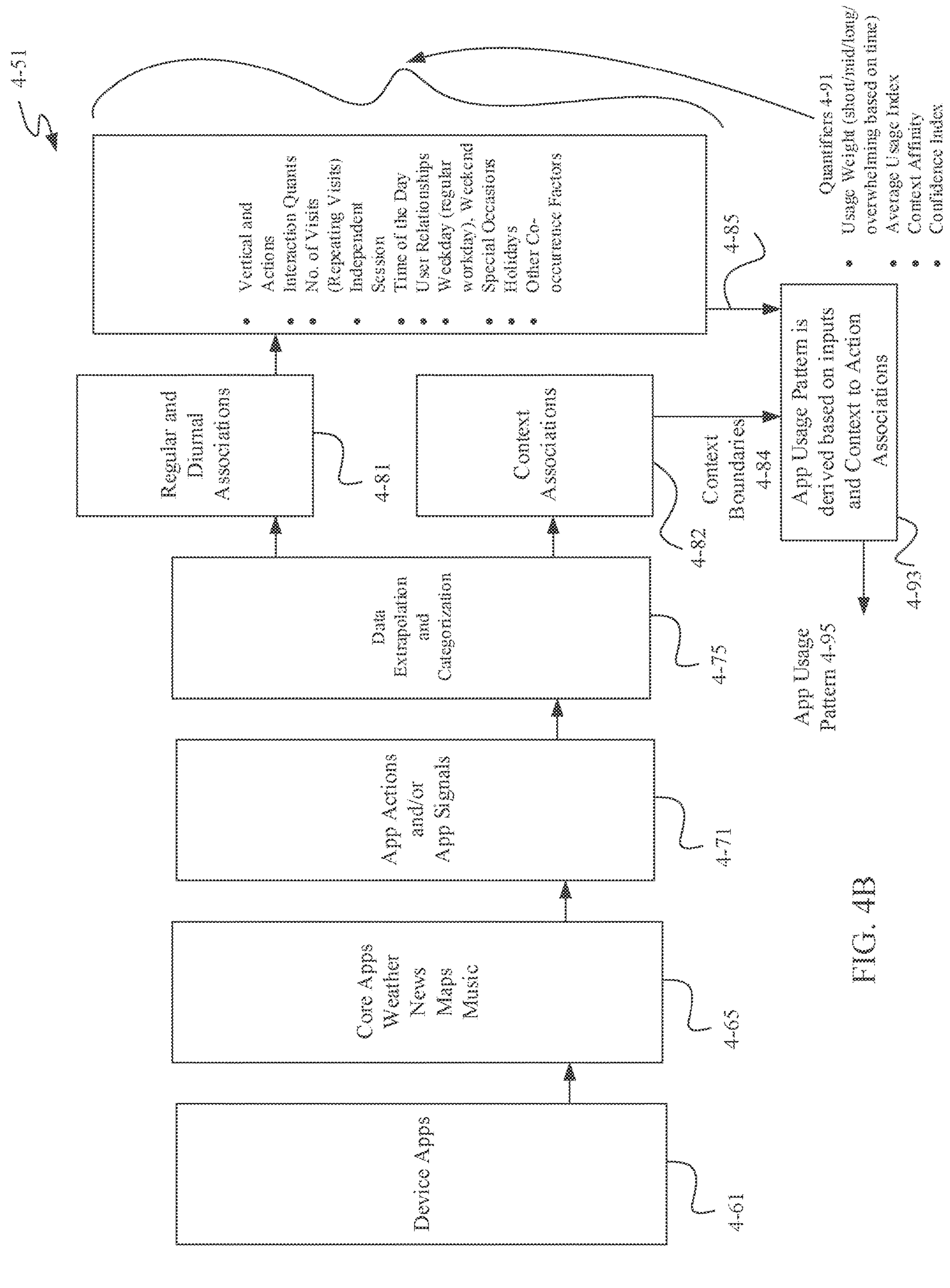
FIG. 4B illustrates an example data flow representation, according to some embodiments.

FIG. 4B provides an illustrative data flow representation of app actions and event collection and association with CVM (context to vertical mapping).

Item 4-61 indicates device apps. Item 4-65 indicates examples of apps such as Core Apps and also weather new, maps and music apps. There may be other apps too. 4-71 indicates app actions and signals which are observed. Item 4-75 indicates performing data extrapolation and categorization based on the observed actions and signals. Item 4-82 indicates performing context associations and obtaining context boundaries 4-84. Item 4-81 indicates obtaining regular and diurnal associations. Item 4-82 indicates obtaining context associations. The outputs of 48-1 and 48-1 are, for example, item 4-85 including verticals and actions, interaction quants, number of visits such as repeating visits, independent session, time of the day, user relationships, time of week, special occasions, holidays and other co-occurrence factors. These are quantified by item 4-91 with a usage weight, an average usage index, a context affinity and a confidence index. Items 4-85, 4-91 and 4-84 are fed to item 4-93 and an app usage pattern 4-95 is derived based on context to action associations and based on 4-84, 4-85 and 4-91.

The graph 1-2 may be stored in the graph database 1-7. Alternatively, the graph 1-2 is acted on by the prediction engine 1-3 without first being stored in a database.

As an additional example, when studying at home, a person may play mellow music, dim their room lights, place their phone on do-not-disturb (DND), and/or mute their phone. The CVM may recognize this pattern of actions as a study mode. The study mode is then an example entity mode in addition to social media 3-31 and commuting 3-34 of FIG. 3B. In a second additional example, when driving their car, a person may open a navigation app (for example a map with GPS information showing the car's position and a planned route), and play music on an audio system of the car or play news on the audio system of the car.

Figure 5A:
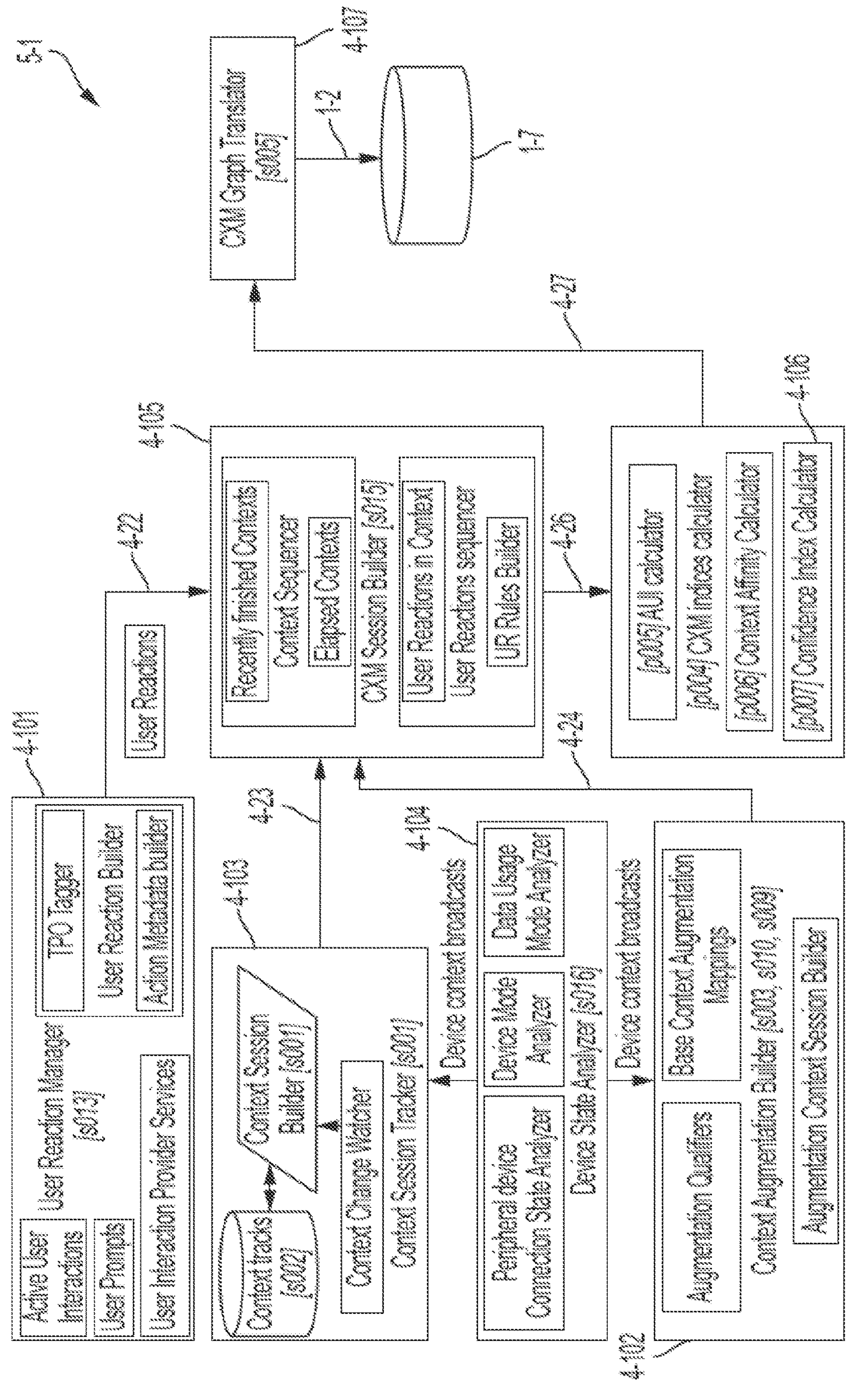
FIG. 5A illustrates another example block diagram of the graph builder, according to some embodiments.

FIG. 5A illustrates an embodiment of the graph builder 1-1 in a system 5-1 with further details.

Similarly to FIG. 4A, FIG. 5A illustrates a user reaction manager 4-101, a context session tracker 4-103, a device state analyzer 4-104, a content augmentation builder 4-102, a session builder 4-105, an indicies calculator 4-26 and a graph translator 4-107.

Referring to FIG. 5A, in one embodiment, the system 1-9 is a C×M system. CXM stands for Context Entity Mapping, where X stands for any type of entity. The system 1-9 is designed to learn any behavioral patterns against fragmented contexts.

Referring to FIG. 5A, the user reaction manager 4-101 provides user reaction data 4-22 with TPO (Time, Place and Occasion) to the CXM session builder 4-105.

The context session tracker 4-103 and the context session builder 4-105 builds situations with functional mapping of contexts received from multiple devices or sources.

The device state analyzer 4-104 receives data from various user devices or sources (see FIG. 4A) and broadcasts contexts to the context session tracker 4-103 and the context augmentation builder 4-102.

Context information received from multiple sources such as 1-30 and 4-109 include base contexts which together can define a user's current scenario 2-2. The base contexts include a context such as time and/or location, and are fragmented enough to get an atomic level contextual signal for granularity.

The context augmentation builder 4-102 augments the base contexts corresponding to base context nodes 2-4, using certain implicit contexts, that is, augmentation contexts corresponding to augmented context nodes 2-6, to qualify the base contexts further for accuracy and correctness.

The CXM session builder 4-105 receives and manages data from the user reaction manager 4-101, the context session tracker 4-103, and context augmentation builder 4-102, and provides data to CXM indices calculator 4-106.

The CXM indices calculator calculates AUI, Context Affinity, and Confidence index (see Equations (1)-(8)), and provides these indices to the CXM graph translator 4-107.

The CXM graph translator 4-107 captures entities occurrence as a function of contexts existence. Each entity is associated with each context through the function. For example, the graph learns based on the user actions.

Figure 5B:
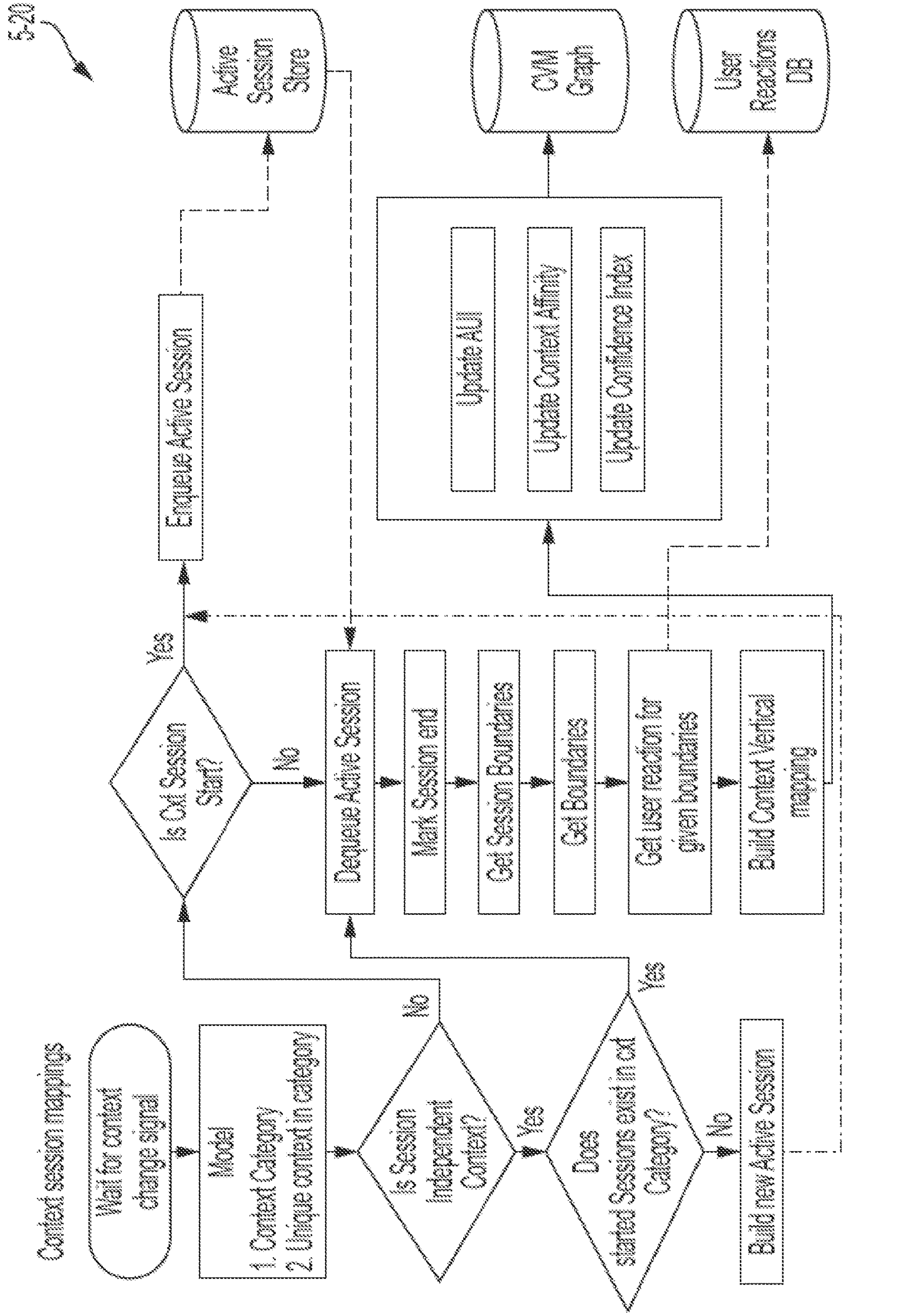
FIG. 5B illustrates a context session builder, according to some embodiments.

FIG. 5B illustrates logic of the context session builder 4-105.

Figure 5C:
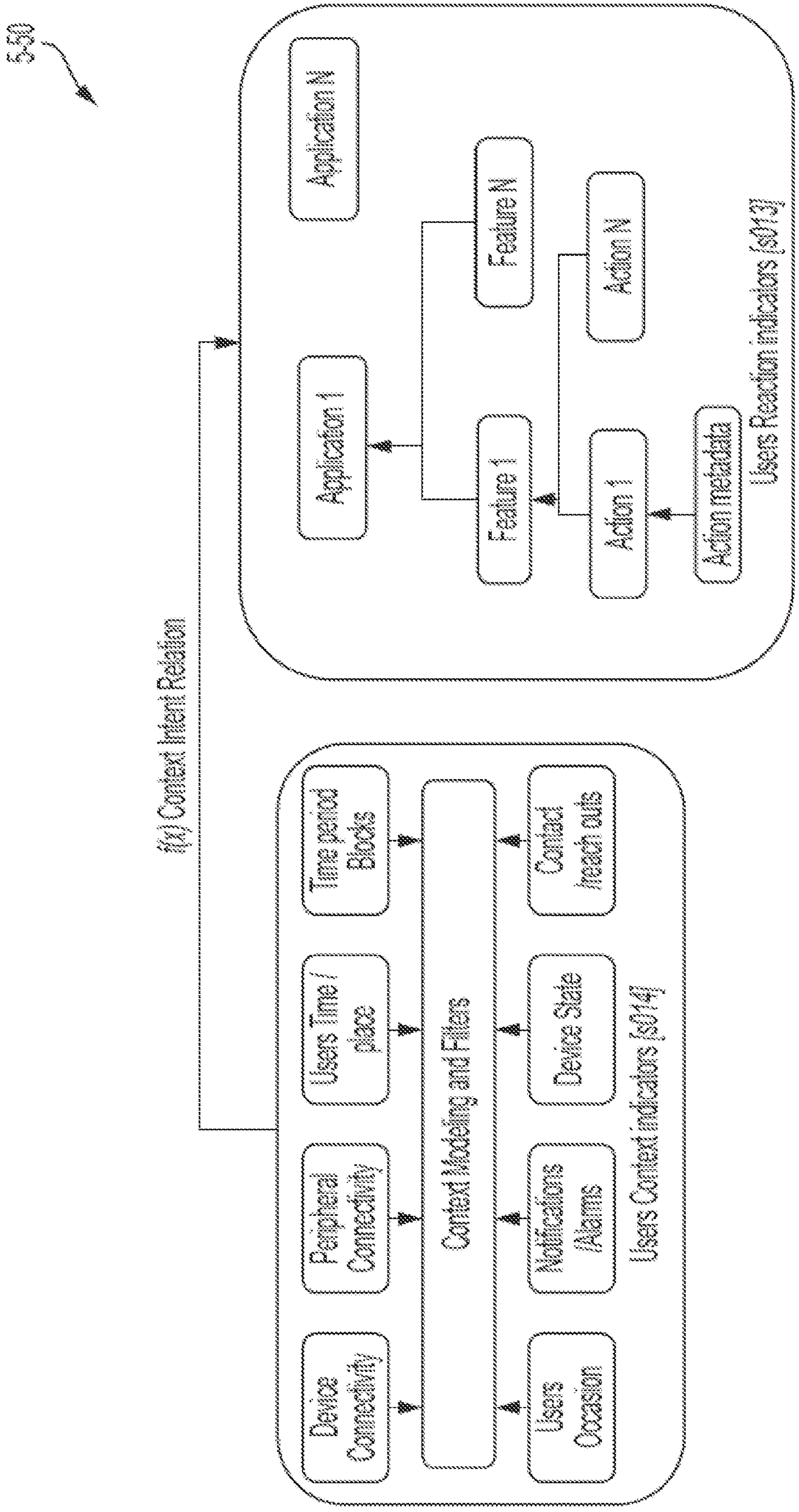
FIG. 5C illustrates a user reaction manager, according to some embodiments.

FIG. 5C illustrates reaction manager 4-101. Context indicators are obtained on the left and related to applications on the right.

Figure 5D:
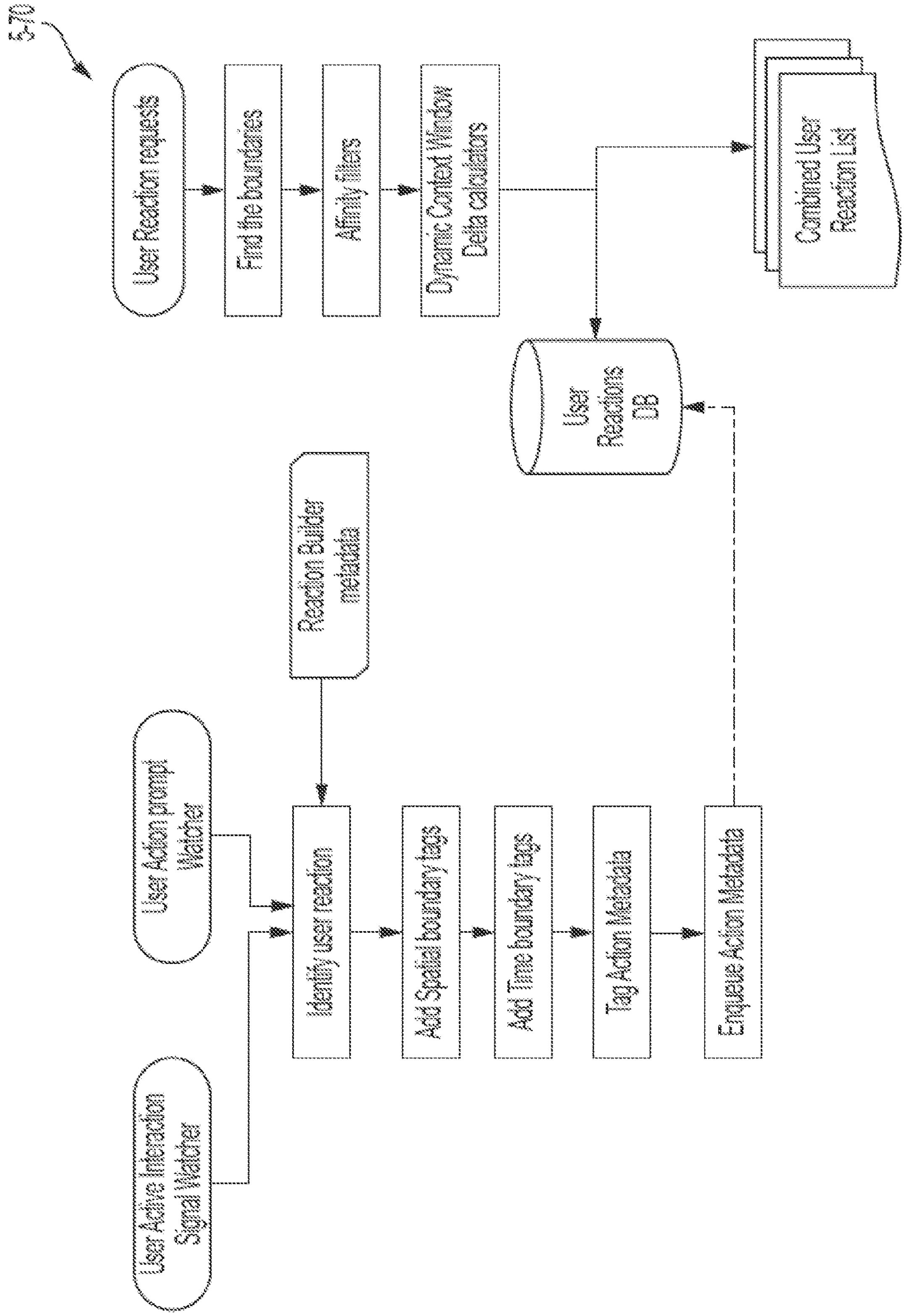
FIG. 5D explains further aspects of the user reaction manager, according to some embodiments.

FIG. 5D illustrates logic used for implementing reaction manager 4-101.

In a CXM graph such as graph 1-2, the context entity functions are updated, whenever an entity occurs or a context changes. This dynamism leads to a dynamic representation of recency and repeatedness.

The CXM graph 1-2, provides an on-demand building of patterns. The fragmented base contexts are converged together to build the scenario 2-2. A combined context-entity function is built for all context-entities, and creates matching patterns on runtime when the prediction engine 1-3 operates to provide the suggested action 1-4.

Developing context based on user intent along with known environment signals provides improved suggested actions 1-4 which are more reliable than less personalized approaches.

As mentioned above, base contexts are obtained from the user time, place and occasion (TPO) information from a user context provider 4-109 or from state of the device 1-30 or other devices.

Context augmentation is the process of qualifying a base context with all known implicit contexts called "augmentation contexts", which are context signals derived in association with overall device (apps, services, connections, modes etc.) and user actions.

Combining the augmentation context with the base context provides a better functional relation between context and user actions and leads to accurate suggested actions 1-4.

Figure 7:
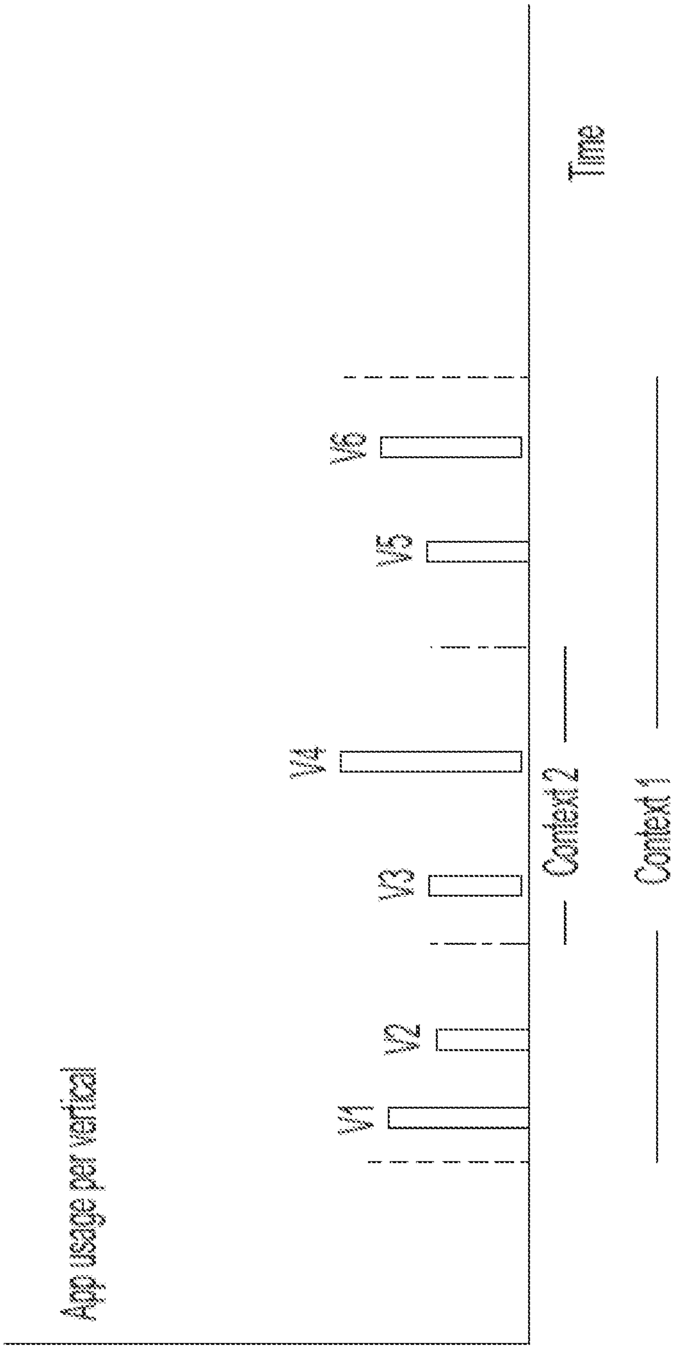
FIG. 7 illustrates app usage and context, according to some embodiments.

FIG. 7 illustrates a Context 1 and a Context 2. Context 1 uses apps V1, V2, V3, V4, V5 and V6 over an extensive time (app boundaries indicated by vertical dashed lines). Context 2 uses only V3 and V4 and over a more limited time (time boundaries indicated by vertical dash-dot lines).

Figure 8:
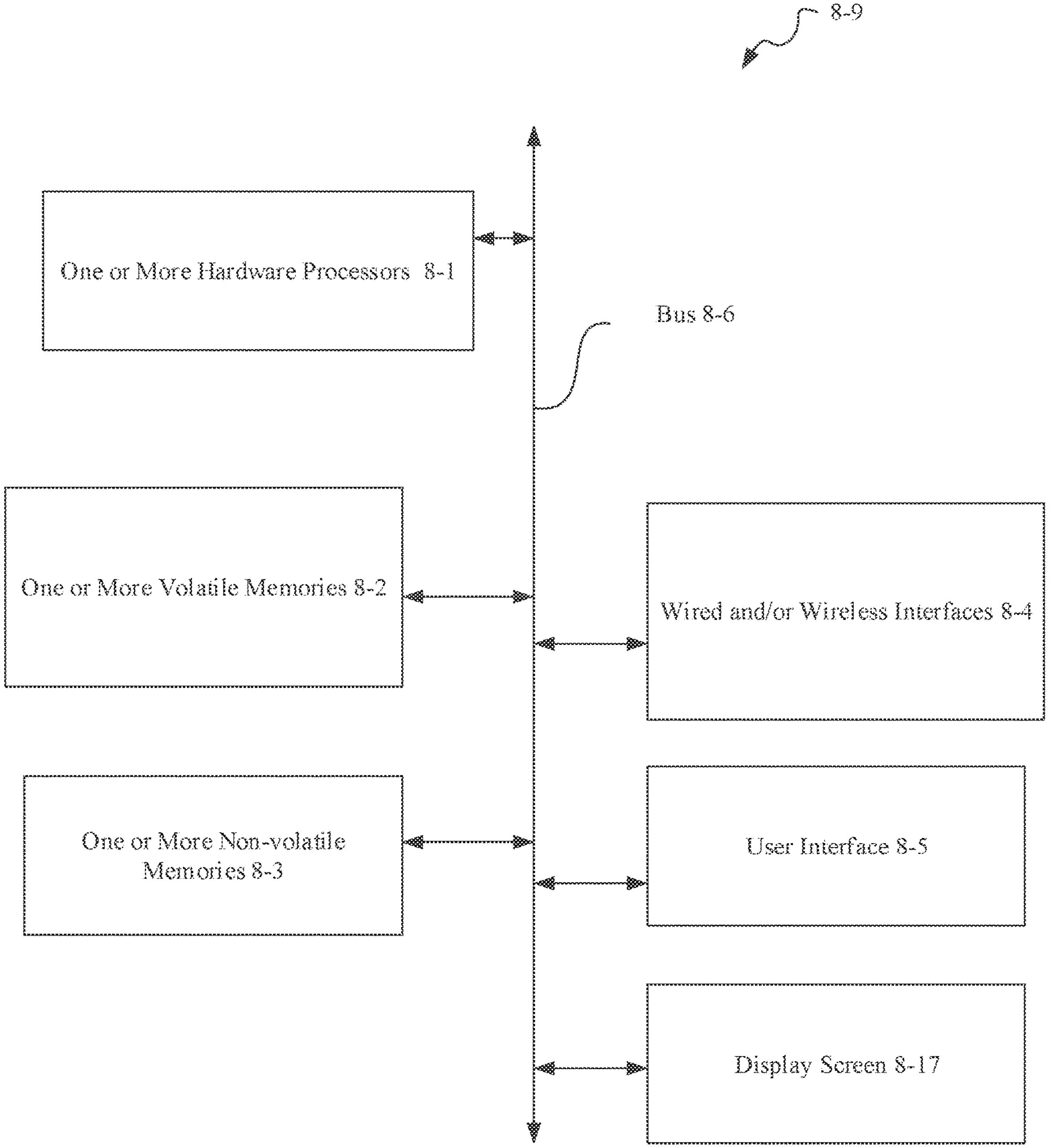
FIG. 8 illustrates an apparatus for implementation of the graph builder and the prediction engine, according to some embodiments.

FIG. 8 illustrates an exemplary apparatus for implementation of the embodiments disclosed herein. The apparatus may be a server, a computer, a laptop computer, a handheld device, or a tablet computer device, for example. The apparatus may include one or more hardware processors 8-1. The one or more hardware processors 8-1 may include an ASIC (application specific integrated circuit), CPU (for example CISC or RISC device), and/or custom hardware. The apparatus also may include a user interface 8-5 (for example a display screen and/or keyboard and/or pointing device such as a mouse). The apparatus may include one or more volatile memories 8-2 and one or more non-volatile memories 8-3. The one or more non-volatile memories 8-3 may include a non-transitory computer readable medium storing instructions for execution by the one or more hardware processors 8-1 to cause the apparatus to perform any of the methods of embodiments disclosed herein. The instructions may be accessible via a bus 8-6.

What is claimed is:

1. A method comprising:

determining one or more current user-specific base contexts, each base context corresponding to a first node in a graph and having a predetermined connection to one or more user-behavior nodes in the graph, wherein the one or more user-behavior nodes may be one or more entity nodes;

determining for a user, based on information associated with a user device, one or more current user-specific and dynamically determined augmented contexts, each augmented context corresponding to a second node in the graph;

for each base context node and each augmented context node, determining a user-specific value of a connection between that context node and each user-behavior node in the graph that the context node is connected to, wherein each user-specific value is based on a plurality of weighted indices, wherein at least one index of the plurality of weighted indices comprises a context affinity defining how close a specific user interaction occurrence is to a boundary of a context window, and wherein a magnitude of the context affinity is higher at an edge of the context window than at a center of the context window;

comparing each user-specific value to a threshold value and, for each user-specific value above the threshold value, adding the context node corresponding to the connection to a scenario specific to the user-behavior node corresponding to the connection;

scoring each scenario based on a group of user-specific values for a corresponding group of contexts in that scenario;

selecting the user-behavior node corresponding to a highest scoring scenario and identifying the selected user-behavior node as a current action of the user; and performing, by the user device, a user-device action based on the current action of the user, wherein the one or more user-behavior nodes comprise a social media node and a commuting node, wherein the plurality of weighted indices correspond respectively to a data connectivity, a peripheral connectivity, a workday/holiday value, a time-of-day, a day-of-week, and a triggering action, wherein the determining of the user-specific value comprises determining a first user-specific value for the social media node and a second user-specific value for the commuting node, wherein the scoring of each scenario comprising determining a first score for the social media node and a second score for the commuting node, and wherein the performing of the user-device action is based the current action of the user based on the scoring, and the user-device action corresponds to the social media node or the commuting node.

2. The method of claim 1, wherein at least one second index of the plurality of weighted indices comprises an average usage index defining an amount of a specific user-device interaction during a time window relative to a total amount of user-device interactions during the time window.

3. The method of claim 1, wherein at least one second index of the plurality of weighted indices comprises a confidence index identifying a first nearness in time and a second nearness in frequency of occurrence of a vertical usage during a confidence interval.

4. The method of claim 3, wherein a vertical is a group of similar applications.

5. The method of claim 1, wherein the method further comprises storing the graph in a graph database.

6. The method of claim 1, wherein the method further comprises fetching the graph from a graph database.

7. An apparatus comprising:

one or more memories storing instructions; and one or more processors configured to execute the instructions and cause the apparatus to:

determine one or more current user-specific base contexts, each base context corresponding to a first node in a graph and having a predetermined connection to one or more user-behavior, determine for a user, based on information associated with a user device, one or more current user-specific and dynamically determined augmented contexts, each augmented context corresponding to a second node in the graph, for each base context node and each augmented context node, determine a user-specific value of a connection between that context node and each user-behavior node in the graph that the context node is connected to, wherein each user-specific value is based on a plurality of weighted indices, wherein at least one index of the plurality of weighted indices comprises a context affinity defining how close a specific user interaction occurrence is to a boundary of a context window, and wherein a magnitude of the context affinity is higher at an edge of the context window than at a center of the context window, compare each user-specific value to a threshold value and, for each user-specific value above the threshold value, adding the context node corresponding to the connection to a scenario specific to the user-behavior node corresponding to the connection, score each scenario based on a group of user-specific values for a corresponding group of contexts in the each scenario, select the user-behavior node corresponding to a highest scoring scenario and identifying the selected user-behavior node as a current action of the user, and perform a user-device action based on the current action of the user, wherein the one or more current user-specific base contexts comprise a social media node and a commuting node, wherein the plurality of weighted indices correspond respectively to a data connectivity, a peripheral connectivity, a workday/holiday value, a time-of-day, a day-of-week, and a triggering action, wherein the one or more processors are further configured to:

determine a first user-specific value for the social media node and a second user-specific value for the commuting node, determine a first score for the social media node and a second score for the commuting node, and perform the user-device action based on the current action of the user, the first score, and the second score, the user-device action corresponding to the social media node or the commuting node.

8. The apparatus of claim 7, wherein at least one second index of the plurality of weighted indices comprises an average usage index defining an amount of a specific user-device interaction during a time window relative to a total amount of user-device interactions during the time window.

9. The apparatus of claim 7, wherein at least one second index of the plurality of weighted indices comprises a confidence index identifying a first nearness in time and a second nearness in frequency of occurrence of a vertical usage during a confidence interval.

10. The apparatus of claim 9, wherein a vertical is a group of similar applications.

11. The apparatus of claim 7, further comprising a graph database, wherein the one or more processors are further configured to store the graph in the graph database.

12. The apparatus of claim 7, further comprising a graph database, wherein the one or more processors are further configured to fetch the graph from the graph database.

13. A non-transitory computer readable medium storing instructions, the instructions configured to cause one or more processors of a computer to perform a method comprising:

determining one or more current user-specific base contexts, each base context corresponding to a first node in a graph and having a predetermined connection to one or more user-behavior;

determining for a user, based on information associated with a user device, one or more current user-specific and dynamically determined augmented contexts, each augmented context corresponding to a second node in the graph;

for each base context node and each augmented context node, determining a user-specific value of a connection between that context node and each user-behavior node in the graph that the context node is connected to, wherein each user-specific value is based on a plurality of weighted indices, wherein at least one index of the plurality of weighted indices comprises a context affinity defining how close a specific user interaction occurrence is to a boundary of a context window, and wherein a magnitude of the context affinity is higher at an edge of the context window than at a center of the context window;

comparing each user-specific value to a threshold value and, for each user-specific value above the threshold value, adding the context node corresponding to the connection to a scenario specific to the user-behavior node corresponding to the connection;

scoring each scenario based on a group of user-specific values for a corresponding group of contexts in the each scenario;

selecting the user-behavior node corresponding to a highest scoring scenario and identifying the selected user-behavior node as a current action of the user; and performing, by the user device, a user-device action based on the current action of the user, wherein the one or more current user-specific base contexts comprise a social media node and a commuting node, wherein the plurality of weighted indices correspond respectively to a data connectivity, a peripheral connectivity, a workday/holiday value, a time-of-day, a day-of-week, and a triggering action, wherein the determining of the user-specific value comprises determining a first user-specific value for the social media node and a second user-specific value for the commuting node, wherein the scoring of each scenario comprises determining a first score for the social media node and a second score for the commuting node, and wherein the performing the user-device action is based the current action of the user based on the scoring, and the user-device action corresponds to the social media node or the commuting node.

* * * * *